United States Patent [19]

Stemme et al.

[11] 4,195,924
[45] Apr. 1, 1980

[54] CAMERA WITH ZOOM LENS

[75] Inventors: Otto Stemme, Munich; Günther Kirchhof, Taufkirchen; Peter Lermann, Narring; Volkmar Stenzenberger, Unterhaching; Anton Theer, Munich, all of Fed. Rep. of Germany

[73] Assignee: AGFA-Gevaert, A.G., Leverkusen, Fed. Rep. of Germany

[21] Appl. No.: 927,817

[22] Filed: Jul. 25, 1978

[30] Foreign Application Priority Data

Jul. 29, 1977 [DE] Fed. Rep. of Germany ....... 2734308
Mar. 30, 1978 [DE] Fed. Rep. of Germany ....... 2813590

[51] Int. Cl.² .................. G03B 3/00; G03B 13/10
[52] U.S. Cl. .................................. 354/197; 354/222
[58] Field of Search ........ 354/167, 195, 197, 199–201, 354/221, 222; 352/93, 139, 140, 142; 200/159 A; 334/159

[56] References Cited

U.S. PATENT DOCUMENTS

| 3,665,834 | 5/1972 | Loewe | 354/197 X |
| 4,005,460 | 1/1977 | Mizukawa | 354/195 X |
| 4,038,673 | 7/1977 | Schroder | 354/197 X |
| 4,119,983 | 10/1978 | Tanaka | 354/222 X |

FOREIGN PATENT DOCUMENTS

| 954212 | 11/1956 | Fed. Rep. of Germany | 354/195 |
| 2439421 | 2/1976 | Fed. Rep. of Germany | 200/159 A |
| 956114 | 1/1950 | France | 200/159 A |

*Primary Examiner*—L. T. Hix
*Assistant Examiner*—Thomas H. Tarcza
*Attorney, Agent, or Firm*—Michael J. Striker

[57] ABSTRACT

A still or cinematographic camera has a zoom lens movable between two focal-length settings. An eyelevel viewfinder is provided. Also provided is an actuating arrangement which is coupled with both the zoom lens and with components of the viewfinder so as to change the image are a visible in the viewfinder as it moves the lens from one to the other of the focal-length settings.

12 Claims, 6 Drawing Figures

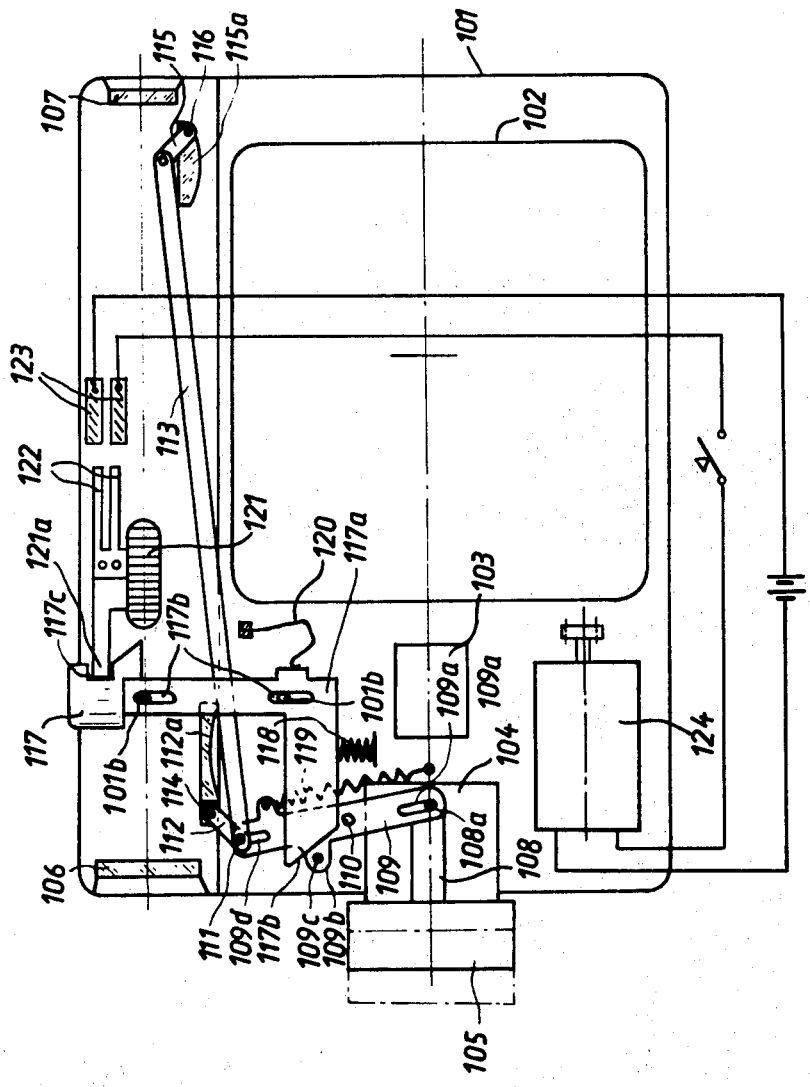

4,195,924

CAMERA WITH ZOOM LENS

BACKGROUND OF THE INVENTION

1. The Field of the Invention

This invention relates to cameras, and more particularly to still cameras as well as to motion-picture cameras.

Still more particularly, the present invention relates to zoom-lens cameras.

2. The Prior Art

It is known to provide especially motion-picture cameras with zoom lenses. Since each adjustment of the focal length also involves a change in the size of the area being photographed, it is necessary to indicate the changed area size in some way to the camera user. For this purpose zoom-lens cameras have become known which are provided with a reflex viewfinder so that focal-length changes resulting from operation of the zoom lens are automatically taken into account in the viewfinder in terms of the different image area displayed in the same.

However, the use of zoom lenses in combination with reflex viewfinders makes these cameras quite expensive. Since in cameras of this kind the presence of the zoom lens is a feature which makes the camera attractive to the user, the only other major cost factor which can be reduced is found in the reflex viewfinder. The camera cost can be reduced if the cost of the viewfinder is reduced by replacing the reflex viewfinder with a simpler, less expensive one.

A suitable, lower-cost alternative is the use of direct-view or eyelevel viewfinders. Here, however, the problem exists how to indicate to the user the different viewing areas which exist in dependence upon the operation of the zoom lens. It is of course possible to superimpose upon the viewfinder image two or more differently sized (and perhaps contrastingly colored) viewing area outlines, usually rectangular in shape. However, these outlines are all visible at the same time, instead of only individually, and this tends to confuse rather than to enlighten, the user.

SUMMARY OF THE INVENTION

Accordingly, it is an object of the invention to overcome the aforementioned disadvantages.

More particularly, it is an object of the invention to provide a camera (still or cinematographic) having a variable (i.e. zoom) lens and a direct-view viewfinder which indicates the different image areas without resorting to viewing area outlines visible in the viewer.

A concomitant object is to provide such a zoom-lens camera with a direct-view viewfinder of the kind mentioned above, and which is simple and inexpensive to construct.

Still another object is to provide such a camera wherein the zoom lens has at least two terminal settings, and wherein the lens always automatically assumes a preferred one of these settings.

In keeping with the above objects, and still others which will become apparent hereafter, one feature of the invention resides, in a camera of the still or of the motion-picture type, in an arrangement which, briefly stated, comprises a variable lens adjustable between a first and at least one second setting, an eyelevel viewfinder having an inlet window, an outlet window arranged on the line of sight therewith, and means including movable elements for clamping the image area visible in the viewfinder in dependence upon the setting of the variable lens, and actuating means operatively connected with the variable lens and with the movable elements for effecting adjustments of the lens between the first and second settings and for effecting concomitant movement of the members in dependence upon the adjustments.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS:

FIG. 6 is a view analogous to FIG. 5, showing the embodiment in a different position.

Figure 1:
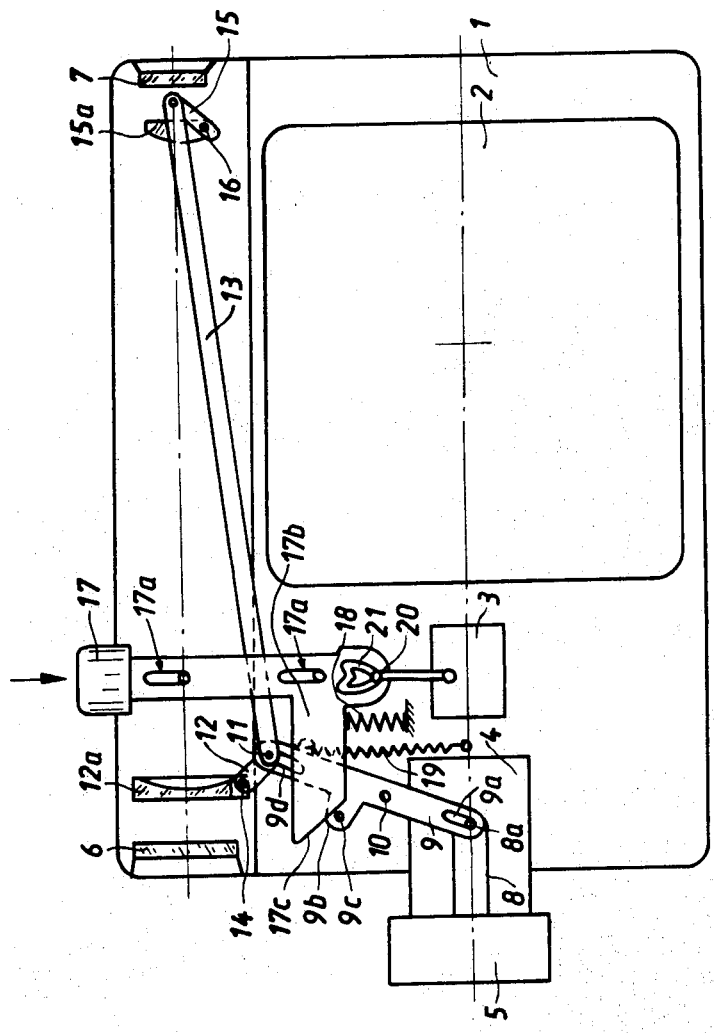
FIG. 1 is a side view of a camera, showing one embodiment of the invention, with a camera sidewall omitted to show the interior.
Figure 2:
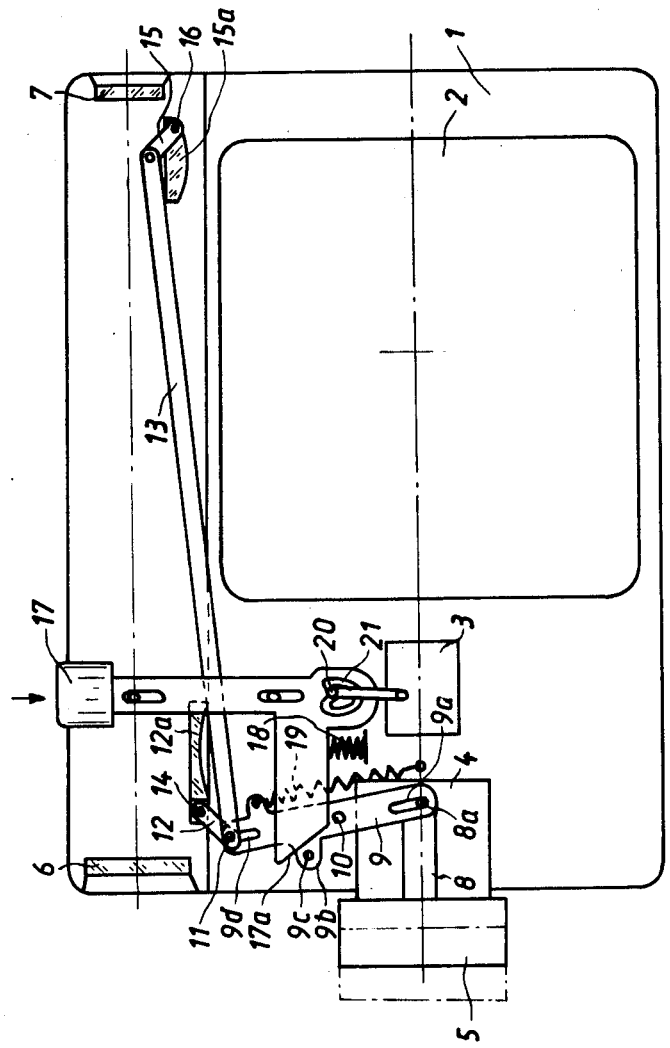
FIG. 2 is a view analogous to FIG. 1 but showing various components in a position different from that in FIG. 1.

DESCRIPTION OF THE PREFERRED EMBODIMENTS:

A first embodiment of the invention is illustrated in FIGS. 1 and 2 which designate with reference numeral 1 the diagrammatically illustrated housing of an amateur camera (e.g. 8 millimeter or super-8) although it is to be understood that the invention is equally applicable to still cameras. Also diagrammatically illustrated is a film cassette 2 installed in the housing 1, and a fixedly mounted lens component 3 in front of which there is located a further lens component 4 having a variable or zoom lens 5. The housing 1 is also provided with a direct-view viewfinder having a window 7 through which the user looks and a window 6 through which the scene to be photographed is viewed.

The zoom lens component 5 has connected to it an arm 8 which extends lengthwise of the optical axis and which is provided with a pin or projection 8a extending into a slot 9a of a lever 9. The latter is mounted so that it can pivot about a stationary pivot 10 and is provided with an extension 9b having a projection or pin 9c. The end of lever 9 which is remote from the slot 9a is provided with a further slot 9b in which a stationarily mounted pin 11 is received. An arm 12 and a link 13 are both pivotably mounted on the pin 11. The arm 12 is a double-armed lever which is also pivotable about a stationary pin or axis 14 and carries at its end remote from the slot 9b a negative lens 12a. The end of the link 13 which is remote from the pin 11 has pivotably mounted on it a further arm 15 which is also pivotably mounted for turning about a stationary axis 16 and which carries at its end which is mounted on the pin 16 a positive lens 15a which is rigid with the arm 15 and pivots with the same about the pin 16.

A pushbutton 17 is provided which can be displaced in direction normal to the optical axis when pressure is applied to it in the direction of the arrow; the pushbutton 17 is guided in the housing 1 via a one or more (two shown) pin-and-slot guides 17a or in another suitable manner. The pushbutton 17 is urged outwardly of the housing by an expansion spring 18 which acts upon its arm 17b. The latter is provided with an inclined end face 17c which is engaged by the pin 9c under the urging of a contraction spring 19 whose opposite ends are connected to a stationary housing part and to a lug of the lever 9, respectively, permanently tending to pivot the lever 9 in clockwise direction.

In FIG. 1 the camera is shown with the zoom lens 5 in the position corresponding to normal focal length. As a rule the lens in such a camera will be movable between two end positions one of which corresponds to the normal focal length and the other of which corresponds to an extended focal length, although of course the other position could also be for wide-angle shots if desired. In the position shown in FIG. 1 the pushbutton 17 is arrested in the illustrated position by a member 20 which is pivoted to the lens component 3 and the opposite end of which is slidably received in a cam curve 21 of approximately heart-shaped configuration. In this position the negative lens 12a is located closely behind the window 6 of the viewer and the positive lens 15a is located closely in front of the window 7 of the viewer. Thus, the area being viewed through the viewing windows 6, 7 and the lenses 12a and 15a corresponds to the area which can be photographed with the lens in its illustrated setting in which the lens is adjusted for normal focal length.

If the camera is now to be readjusted to use the zoom lens and obtain a tele-photography function, the zoom lens component 5 must be moved axially from the normal position (shown in solid lines in FIG. 2) to the extended position which is shown in broken lines. To effect this movement the user depresses the pushbutton 17 in the direction indicated by the arrow; this causes the inclined surface 17a to push against the pin 9c and thus to pivot the lever 9 in counterclockwise direction against the urging of the spring 19. During this movement the zoom lens component 5 moves from the solid-line position to the broken-line position axially along the optical axis. At the same time the link 13 and the arms 12, 15 with which the lenses 12a and 15a are respectively rigidly connected, are so pivoted that the lenses 12a and 15a are moved out of the line of sight connecting the windows 6 and 7 of the viewer. These movements are completed when the follower on the member 20 reaches and enters into the upper detent recess of the cam track 21. In this position the zoom lens component 5 is set for tele-photography whereas the viewer shows a user looking through the windows 6, 7 an image area which is strictly delimited by the boundaries of the windows 6, 7, i.e. in this position the viewer operates as a frame-type viewer.

If subsequently the camera is to be returned to the position of FIG. 1 the pushbutton 17 is again depressed somewhat deeper into the housing 1, causing the follower of the member 20 to move out of the recess at the upper end of the cam track 21, to enter into the steeper part of the cam track 21 at the upper end of the same, and from there into the left-hand downwardly extending part of the cam track. If the user now releases the pressure of the pushbutton 17 the latter is urged upwardly by the spring 18, the follower of the member 20 slides downwardly in the cam track 21 and all components return from the position shown in FIG. 2 to their position shown in FIG. 1 so that the camera is returned to normal focal-length operation.

It will be evident that the embodiment of FIG. 1 is susceptible of a variety of modifications. For example, the member 20 and the cam track 21 could be omitted, in which case the zoom lens 5 would remain in its tele-photography position only as long as the user depresses the pushbutton 17. This is, of course, somewhat less convenient than the illustrated embodiment. The viewfinder itself could also be constructed differently, and could for example be constructed as a Newton viewer (instead of as a frame-type viewer) for the tele-photography setting. In this case additional lenses would then have to be provided which would pivot or otherwise move into the line of sight between windows 6 and 7 when the camera is returned to normal focal length, in order to increase the viewing field. Conversely, the viewfinder could also be so constructed that the walls bounding the windows 6, 7 would act as the viewing field delimitation, i.e. that the viewfinder would operate as a frame-type viewfinder when the camera is in its normal focal-length position (FIG. 1); in that case the operation of the pushbutton 17 to set the camera for tele-photography would then have to either move masks having cutouts delimiting a smaller viewing field into the line of sight or a mirror could be provided which is moved by the mechanism to direct a smaller viewing-area image into the line of sight of the viewfinder. The pushbutton 17 could be omitted and the mounting ring (not separately illustrated) surrounding the zoom lens 5 could be engaged by the fingers of a user and the zoom lens 5 pulled out or pushed in. In this case it would of course be necessary to associate the ring of the zoom lens 5 (e.g. on its arm 8) with two abutments for the outer (tele-photography) and the inner (normal focal length) positions, i.e. a function now performed in the illustrated embodiment by the single or dual pin and slot guides 17a. Also, the zoom lens 5 need not be axially shiftable between its two end positions; instead, it could be slidable or pivotable in a plane normal to the optical axis of the normal-focal-length lens 4, such movement being enforced by engagement of an appropriate part of the zoom lens 5 with the inclined surface 17c of the arm 17b.

Figure 3:
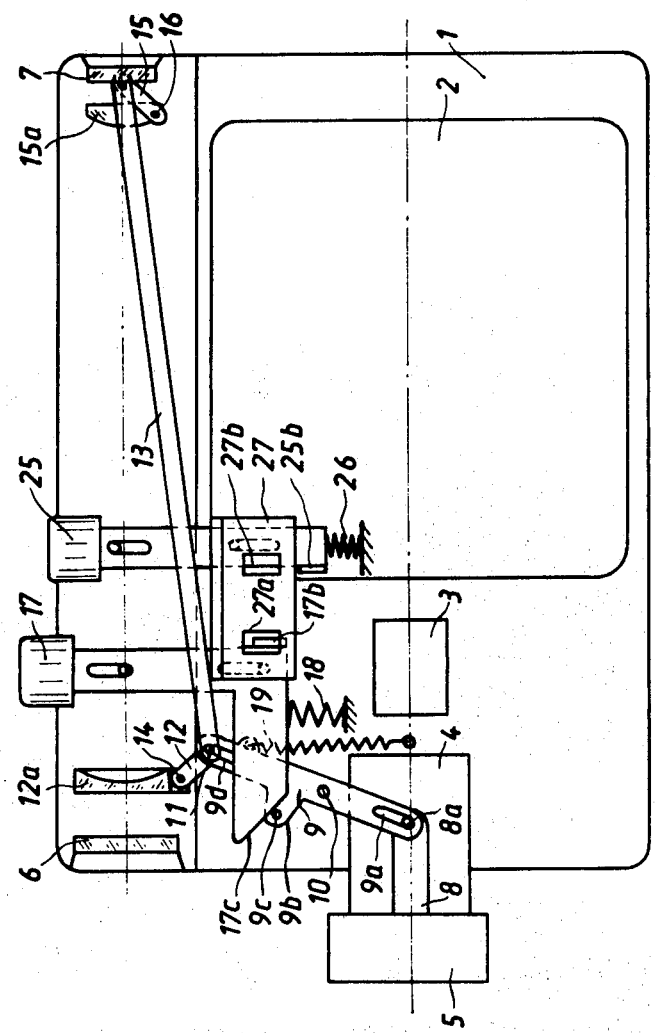
FIG. 3 is a view similar to FIG. 1 but illustrating a different embodiment of the invention.
Figure 4:
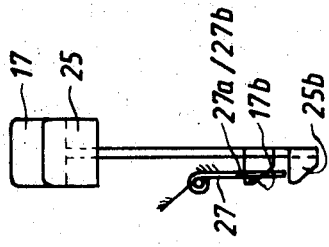
FIG. 4 is a side view of some of the components shown in FIG. 3.

A second embodiment of the invention is illustrated in FIGS. 3 and 4. This embodiment, wherein like reference numerals identify the same elements as in FIGS. 1 and 2, is slightly more complicated but more convenient to use than the one in FIGS. 1 and 2. In the embodiment of FIGS. 3 and 4 the pushbutton 17 operates as in FIGS. 1 and 2 to advance the zoom lens 5 from the normal focal-length position to the zoom lens or tele-photography position. The retraction of the zoom lens to the normal focal length position, however, is here performed by a second pushbutton 25 which is analogous to the pushbutton 17 in its construction and is also urged outwardly of the housing by an expansion spring 26. Both of the pushbuttons 17, 25 are provided with inclined surfaces 17b, 25b, respectively, which are both overlapped by a leaf spring 27 that is provided at the locations where the surfaces 17b, 25b are located behind the leaf spring 27 when the pushbuttons are in their rest positions, with two cutouts 27a and 27b, respectively.

FIG. 3 shows a position of the camera in which the pushbutton 26 has been operated, i.e. has been pushed into the camera so that the zoom lens component 5 has been retracted and the lens is set for normal focal-length. The pushbutton 17 and the components controlled by it (e.g. 12, 13, 15, etc.) are in positions corresponding to those shown in FIG. 1. The lower edge of the spring 27 has snapped behind the upper end of the inclined surface 25b, arresting the pushbutton 25 in the illustrated position. If a user now desires to set the camera for tele-photography he depresses the pushbutton 17. This causes the inclined surface 17b to press against the lower edge of the cutout 27a, thus lifting the spring 27 off from the upper edge of the inclined surface 25b so that the pushbutton 25 snaps upwardly and outwardly of the housing under the influence of the spring 26. When the pushbutton 17 has been fully depressed the optical components will have been moved to the position shown in FIG. 2 as described with reference to the same. In this position the spring 27 snaps behind the upper end of the inclined surface 17b and thus retains the pushbutton 17 in its inner position (corresponding to the position shown in FIG. 2). To return the camera to normal focal-length position the pushbutton 25 is depressed which disengages the spring 27 from the pushbutton 17 in a manner analogously described with reference to the disengagement of the spring 27 from the pushbutton 25; this allows the pushbutton 17 to snap back to its rest position under the influence of the spring 18 and the optical components associated with the pushbutton 17 then move from the position illustrated in FIG. 2 to the position illustrated in FIG. 1 (and also in FIG. 3). A particular advantage of the embodiment in FIGS. 3 and 4 is that a user can tell from the position of the pushbuttons 17 and 25 (i.e. whether they are extended or depressed) which focal length is selected at any particular time, i.e. for which focal length the camera is set.

Both of the embodiments in FIGS. 1 and 2 and FIGS. 3 and 4 have the advantage that to select two different focal lengths it is merely necessary to provide a zoom lens which is corrected for these two specific focal lengths; such lens is less expensive to produce than two exchangeable lenses or a zoom lens which is corrected for all focal lengths, i.e. not only for the two which are actually required but also for all focal lengths inbetween them. Moreover, in both embodiments an inexpensive direct-view viewfinder can be used and the controls which coordinate the movements of the zoom lens and of the viewfinder components (i.e. the lenses 12a and 15a) are in form of simple levers and linkages which can be inexpensively produced.

Particularly when operating in haste, amateur photographers sometimes forget to check the setting of their zoom lens camera and this may, evidently, lead to missed or spoiled pictures. An attempt has been made to overcome the problem by providing a zoom lens camera having, as in FIGS. 1–4, two focal-length settings but wherein the camera automatically always returns to a preferred one of these settings, e.g. to the normal focal length setting or else to the tele-photography setting.

Figure 5:
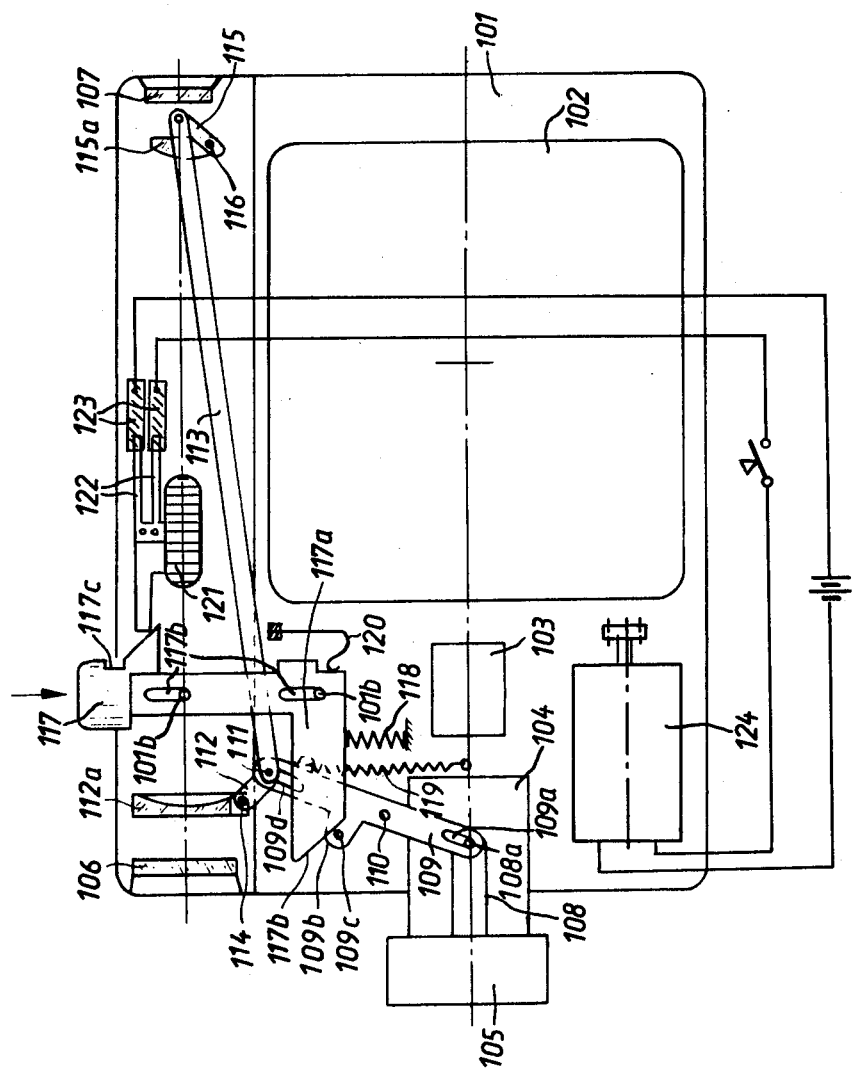
FIG. 5 is another view similar to FIG. 1, but illustrates still another embodiment in one position.

In FIGS. 5 and 6 the camera housing is identified with reference numeral 101; it is again illustrated as the housing of an amateur cinematographic camera having installed therein a film cassette 102. Evidently, however, the invention is equally well applicable to a still camera. The camera is provided with a fixed lens component 103 and a lens component 104 which is arranged in front of it on the optical axis of the camera and is provided with an axially shiftable zoom lens component 105. A direct-view viewfinder is provided, having the viewing window 107 and the inlet window 106.

As before, the zoom lens component 105 is provided with an arm 108 extending in axial direction of the optical axis and having a pin 108a which extends into a slot 109a of a lever 109 which is pivotable about a stationary axis 110 and has a lug 109b provided with a pin or projection 109c. The end of the lever 109 which is remote from the slot 109a is provided with a slot 109d in which a pin 111 engages; an arm 112 and a link 113 are pivotably mounted on the pin 111. The arm 112 is constructed as a double-armed lever pivotable about a stationary axis 114 and having its arm that is remote from the slot 109d configurated as a negative lens 112a. The end of the link 113 which is remote from the slot 109d has pivoted to it a further arm 115 which is also turnably mounted on a stationary axis 116; a positive lens 115a is mounted on and pivotable with the arm 115.

A pushbutton 117 which corresponds to the pushbutton 17 of the preceding embodiments is provided and can be pushed inwardly of the housing 101 in direction of the arrow 117, i.e. in direction normal to the optical axis of the camera. It is biased outwardly of the housing by an expansion spring 118 and is provided with an arm 117a formed with an inclined surface 117b. The pin 109c is in engagement with and tracks the surface 117b under the influence of a spring 119 which is connected at one end to a stationary component of the housing and at the other end to the lever 109 which it tends permanently to displace in clockwise direction. The length and direction of movement of the pushbutton 117 are determined by pin and slot guides 101b, 117b. The engagement of the pins 101b at the opposite ends of the respective slots 117b determines the two possible end positions of the zoom lens component 105, i.e. the normal focal length setting and the telephoto lens setting.

FIG. 5 illustrates the camera in a position corresponding to the normal position of views, which may be either the normal focal length setting or else e.g. a slight wide-angle setting. The pushbutton 117 is retained in its outer or rest position by the spring 118 and the engagement of the pin 101b with the inner ends of the slots 117b. In this position the lens 112a is located slightly behind the inlet window 106 of the viewer as a viewer lens, and the positive lens 115a is located slightly inwardly of the window 107 as the viewer ocular, both lenses 112a and 115a being interposed in the line of sight connecting the windows 106 and 107 so that the area which can be seen through the viewer corresponds to the area that can be photographed with the lens set for the shorter or normal focal-length setting.

In the same manner as in the preceding embodiments the lens system 103, 104 and 105 can be corrected for only two end positions, i.e. for the normal focal-length position and the zoom lens position, without having to be corrected for the positions intermediate these two end positions. This makes it possible to use a lens system which is considerably less expensive than would otherwise be possible. To set the lens system for the longer focal length, e.g. for tele-photography, the zoom lens component 105 must be moved from the position shown in FIG. 5 (and shown in full lines in FIG. 6) to the broken-line position of FIG. 6. To effect this axial movement the pushbutton 117 is depressed in the direction of the arrow from the position in FIG. 5 to the position in FIG. 6 until the pins 101b engage the upper ends of the slots 117. This movement causes the inclined surface 117b of the arm 117a to pivot the lever 109 via the pin 109c of the same in counterclockwise direction against the urging of the spring 119. This causes the zoom lens component 105 to be moved from the solid-line position to the broken-line position. At the same time it also causes the link 113 and the arms 112, 115 with their lenses 112a, 115a to be so pivoted that the lenses 112a, 115a are pivoted out of the line of sight between the windows 106 and 107. The lens is now set for the longer focal length and the area visible through the viewer 106, 107 is determined only by the walls bounding the windows 106, 107, i.e. the viewer acts in this position as a frame-type viewer.

To reset the camera from the position in FIG. 6 (e.g. the tele-photo position) to the position in FIG. 5 (e.g. to the normal focal-length position) the user releases the pushbutton 117 so that the spring 118 urges the pushbutton 117 back to the position shown in FIG. 5. Due to the inter-linking of the various movable components all of the components in question (i.e. the link 113 with the associated arms and lenses 112a, 115a and the zoom lens component 105) are restored to the position which they originally had in FIG. 5. This means that in the embodiment of FIGS. 5 and 6 the camera will always be set for the normally used shorter focal length as long as the pushbutton 117 is not depressed. The user, being aware of this as a basic feature of his camera, can never be in any doubt as to the setting of the camera and thus the chance of missed or spoiled pictures is considerably reduced.

An additional spring 120 is provided, here as a bent leaf spring or the like, which—on depressing of the pushbutton 117—offers some resistance to the inward movement of the pushbutton 117. Once this resistance has been overcome the pushbutton 117 can snap inwardly at considerable speed so that the axial displacement of the zoom lens component 105 and the movement of the lenses 112a and 115a take place very rapidly. Because of this the change in focal length setting is barely noticeable for the user looking through the viewer 106, 107 and the actual focal length change takes place very rapidly. An advantage of this is that due to the rapid change of the image reaching the film through the reset lens, special effects can be produced on the film. However, if such special effects are not desired than the spring 120 can be omitted.

Optionally, the camera housing 101 may be provided with a member 121 which can serve to arrest the pushbutton 117 (by entering with its nose 121a into a recess 117c of the pushbutton) in a retracted position so that the camera can be accommodated in a camera casing (not shown) which is shorter than would be possible if the zoom lens component 105 were in the extended brokenline position of FIG. 6. To avoid the possibility that the user might accidentally use the camera with this focal length setting when such is not desired, the camera motor 124 is connected in circuit with terminals 123 of a motor switch. These terminals are so positioned that the switch will be opened and the supply of electric current to the motor 124 will be interrupted when the member 121 is moved to the position shown in FIG. 6 and its conductive portions 122 disengage from the terminals 123. Thus, the camera cannot be operated until the user returns the member 121 (in rightward direction in FIG. 6) to a position in which its portions 122 engage the terminals 123 (see FIG. 5) and bridge the same, thus completing the motor circuit and allowing electric current to be supplied to the same. Of course, as member 121 is moved rightwardly in FIG. 6, it disengages the pushbutton 117 and the latter snaps up under the influence of the spring 118 and automatically sets the camera lens for the normally used focal length setting.

The embodiment of FIGS. 5 and 6 has the advantage of retaining the possibility (discussed with respect to FIGS. 1–4) of using a zoom lens which is corrected only for two end positions but not for intermediate positions, and of also using an inexpensive direct-view viewfinder. In addition, however, the lens is automatically returned to the focal length setting which is the more frequently used one so that the camera user is assured that his camera will always be set for normal operation unless he deliberately selects the other possible focal length.

While the invention has been illustrated and described as embodied in a cinematographic camera, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. In a camera, a combination comprising a variable lens having lens components all located on and adjustable lengthwise of a first optical axis common to them, between a first and at least one second setting; an eye-level viewfinder having an inlet window, and outlet window spaced from said inlet window along a second axis substantially parallel to said first axis and with said inlet window arranged on the line of sight, and means including movable elements for changing the image area visible in said viewfinder in dependence upon the setting of said variable lens; and actuating means operatively connected with said variable lens and with said movable elements for effecting adjustment of said lens components between said first and second settings and for effecting concomitant movement of said elements in dependence upon said adjustments.

2. A combination as defined in claim 1, said movable elements being viewfinder lenses which are pivotable into and out of said second axis.

3. A combination as defined in claim 2, said actuating means comprising a pivoted lever having one arm and another arm, cooperating first coupling portions on said one arm and one of said lens components, a tilt arm having one end portion and another end portion provided with one of said viewfinder lenses, and second cooperating coupling portions connecting said other arm and said one end portion.

4. A combination as defined in claim 3, wherein said cooperating coupling portions are slot-and-pin couplings.

5. A combination as defined in claim 3, one of said second coupling portions being a pin, and said actuating means further comprising a link having one end pivoted to said pin, and another end pivoted to a further tilt arm one end portion of which is provided with another of said viewfinder lenses.

6. A combination as defined in claim 5, said actuating means further comprising a member movable between first and second end positions respectively corresponding to said first and second settings.

7. A combination as defined in claim 6, said member being a pushbutton provided with a surface inclined to the direction of movement of said pushbutton; and said actuating means further comprising a projection on said pivoted lever and engaging said inclined surface in resiliently tracking relationship therewith.

8. A combination as defined in claim 7, said pushbutton being movable between an outer and an inner position corresponding to said first and second end positions; and further comprising means for releasably arresting said pushbutton in the respective positions, including a substantially heart-shaped cam curve on a portion of said pushbutton and a follower resiliently tracking said cam curve and being engageable with recesses provided in upper and lower portions of said cam curve.

9. In a camera, a combination comprising a variable lens adjustable lengthwise of a first optical axis between a first and at least one second setting; an eyelevel viewfinder having an inlet window, an outlet window spaced from said inlet window along a second axis substantially parallel to said first axis and with said inlet window arranged on the line of sight, and means including movable elements for changing the image area visible in said viewfinder in dependence upon the setting of said variable lens; actuating means operatively connected with said variable lens and with said movable elements for effecting adjustments of said lens between said first and second settings and for effecting concomitant movement of said elements in dependence upon said adjustments, said actuating means comprising a first pushbutton coupled with said lens and movable between first inner and outer positions corresponding to said first and second settings, respectively, and a second pushbutton coupled with said movable elements and movable between second inner and outer positions; and means interconnecting said pushbuttons so that movement of one of said pushbuttons from the outer to the inner position thereof releases the other pushbutton for movement to the outer position thereof, and vice versa.

10. In a camera, a combination comprising a variable lens adjustable lengthwise of a first optical axis between a first and at least one second setting corresponding to a shorter and to a longer focal length, respectively; an eyelevel viewfinder having an inlet window, an outlet window spaced from said inlet window along a second axis substantially parallel to said first axis and with said inlet window arranged on the line of sight, and means including movable elements for changing the image area visible in said viewfinder in dependence upon the setting of said variable lens; and actuating means operatively connected with said variable lens and with said movable elements for effecting adjustments of said lens between said first and second settings and for effecting concomitant movement of said elements in dependence upon said adjustments, said actuating means comprising a pushbutton movable between two end positions which correspond to said first and second settings, and biasing means permanently urging said pushbutton to one of said end positions, said lens being set for said shorter focal length when said pushbutton is in said one end position thereof and for said longer focal length when said pushbutton is moved to another of said end positions in which it is depressed inwardly of the camera; further comprising a film-transporting camera motor and an electrical circuit connected with said motor, including a switch for opening and closing said circuit; and means for arresting said pushbutton in said other end position, including a member which opens said switch and thereby said circuit when said arresting means arrests said pushbutton in said other end position, and vice versa.

11. A combination as defined in claim 10, wherein said lens has a slight wide-angle effect when it is set for said shorter focal length.

12. A combination as defined in claim 10, wherein said lens has an overall length in direction longitudinally of its optical axis which is greater when the lens is set for said shorter focal length than when it is set for said longer focal length.

* * * * *